United States Patent [19]
Torii et al.

[11] 3,922,233
[45] Nov. 25, 1975

[54] WHITE EMITTING PHOSPHORS

[75] Inventors: Tatsuki Torii; Yoshihisa Nagashima; Haruhiko Kitamura; Etsuo Mori, all of Kanagawa, Japan

[73] Assignee: Dai Nippon Toryo Kabushiki Kaisha, Osaka, Japan

[22] Filed: Oct. 15, 1974

[21] Appl. No.: 514,711

[30] Foreign Application Priority Data

Oct. 13, 1973 Japan.............................. 48-114344

[52] U.S. Cl. 252/301.6 S; 252/301.4 S; 252/301.4 R
[51] Int. Cl.² .............. C09K 11/10; C09K 11/14; C09K 11/18; C09K 11/30; C09K 11/46 C09K 11/30; C09K 11/46
[58] Field of Search 252/301.6 S, 301.4 S, 301.4 R; 313/467

[56] References Cited
UNITED STATES PATENTS

| | | | |
|---|---|---|---|
| 1,988,605 | 1/1935 | Michelssen | 252/301.6 S |
| 2,219,929 | 10/1940 | Kaufmann | 252/301.6 S |
| 2,461,726 | 2/1949 | Ellefson | 252/301.6 S |
| 2,623,857 | 12/1952 | Kroger | 252/301.6 S |
| 2,623,858 | 12/1952 | Kroger | 252/301.6 S |
| 3,649,555 | 3/1972 | Mathers et al. | 252/301.6 S |

*Primary Examiner*—Jack Cooper
*Attorney, Agent, or Firm*—Sughrue, Rothwell, Mion, Zinn & Macpeak

[57] ABSTRACT

A mixture of yellowish green-to-yellow emitting, gold- and aluminum-activated zinc sulfide and blue-emitting silver-activated zinc sulfide, in which the weight ratio of the latter to the former is within a range of 0.7 to 1.30, is valuable as a white-emitting phosphor for black and white television. When at least one red-emitting phosphor selected from europium-activated yttrium oxysulfide, europium-activated yttrium oxide and europium-activated yttrium vanadate is incorporated into the above white-emitting phosphor, the resulting composite can cover a more wide white region for black and white television.

8 Claims, 2 Drawing Figures

WHITE EMITTING PHOSPHORS

BACKGROUND OF THE INVENTION

This invention relates to a white emitting phosphor for black and white television.

Any of white emitting phosphors now practically used for black and white television is not a single component, but a yellow emitting phosphor and a blue emitting phosphor are incorporated in such a suitable ratio that they emit practically white light under excitation by cathode rays.

The phosphors now actually used for black and white television have color points decided in the JEDEC (Joint Electron Device Engineering Councils) standard of which the area is surrounded by color points ($x = 0.273, y = 0.282$), ($x = 0.267, y = 0.303$), ($x = 0.286, y = 0.326$) and ($x = 0.290, y = 0.303$) according to the CIE colorimetric system or have color pints in the white color region near said JEDEC standard. Now practically, a silver-activated zinc-cadmium sulfide phosphor (Zn, Cd)S : Ag or copper- and aluminum-activated zinc-cadmium sulf-de phosphor (Zn, Cd)S : Cu : Al is used as the yellow-emitting conponent, and a silver-activated zinc sulfide phosphor (ZnS : Ag) is used as a blue-emitting component. Among these components, the yellow-emitting component contains cadmium as a host constituent, and in the case of a combination of the (Zn, Cd)S : Ag and ZnS : Ag, the amount of cadmium is about 18% by weight based on the whole white-emitting phosphor and in the case of a combination of the (Zn, Cd)S : Cu : Al and ZnS : Ag, the amount of cadmium is about 5% by weight based on the whole white-emitting phosphor.

As is well known, cadmium is highly toxic to the human body and it causes various problems in many fields. From the practical viewpoint, use of a phosphor containing such harmful metal is not preferred, and special cares should be taken during the step of preparing such a phosphor and the step of screening process on black and white tubes. Further, much attention is given to damages by cadmium at breakage of television sets or on disposal of discarded television sets. Still further, the permissible content is legally regulated very severely on treatments of wastes. Accordingly, large-scale treatment equipments are necessary for reducing the cadmium content below the permissible limit in exhaust gases or waste waters discharged from plants for production of phosphors or plants for manufacture of picture tubes for black and white television. Therefore, development of white-emitting phosphors free of cadmium has eagerly been desired.

SUMMARY OF THE INVENTION

It is, therefore, a primary object of this invention to provide a white-emitting phosphor for black and white television which does not at all contain cadmium.

In accordance with this invention, there is provided a white-emitting phosphor comprising a mixture of yellowish green-to-yellow emitting, gold- and aluminum-activated zinc sulfide and blue-emitting silver-activated zinc sulfide, in which the weight ratio of the latter to the former is within a range of from 0.7 to 1.30. When at least one red-emitting phosphor selected from europium-activated yttrium oxysulfide, europium-activated yttrium oxide and europium-activated yttrium vanadate is incorporated into the above white-emitting phosphor, the resulting composite can cover a more wide white region for the black and white television.

DETAILED DESCRIPTION OF THE INVENTION

In the white-emitting phosphor of this invention, a ZnS : Au : Al phosphor which does not at all contain cadmium is used as the yellow-emitting component and a ZnS : Ag phosphor is used as the blue-emitting component. The ZnS : Au : Al phosphor is obtained by adding to raw powder of zinc sulfide suitable amounts of a gold compound such as gold chloride ($HAuCl_4 \cdot 2H_2O$) and an aluminum compound such as aluminum sulfate $[Al_2(SO_4)_3 \cdot 18H_2O]$ and firing the mixture at 950° to 1030°C. in a reducing atmosphere for 1 to 5 hours, and this phosphor has cubic crystal structure. Its emission color varies depending on the amount of activating gold. More specifically, when the amount of activating gold is small, its emission is green light and as the amount of activating gold increases, the emission light shifts to the region of a longer wavelength. When the amount of activating gold further increases beyond a certain amount, the emission light returns to the shorter wavelength region again.

Figure 1:
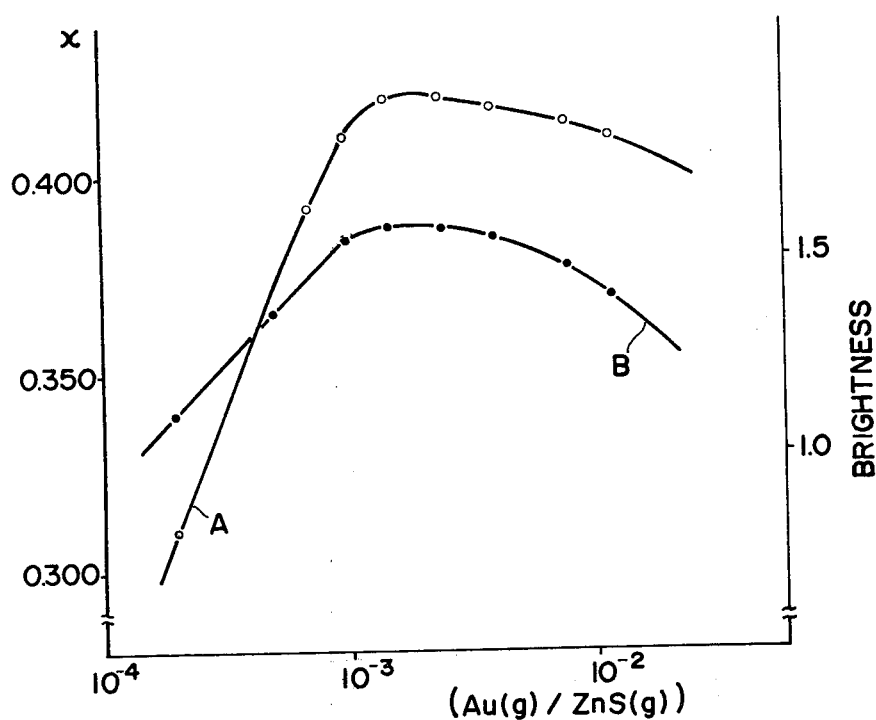
FIG. 1 illustrates the relation between the amount of activating gold and the value $x$ of chromatocity (curve A) and the relation between the amount of activating gold and the brightness (curve B) in the ZnS : Au : Al phosphor to be used in this invention.

As is apparent from FIG. 1, the value $x$ of chromatocity increases greatly with the amount of activating gold within a range of $10^{-4}$ to $10^{-3}$ g per g of zinc sulfide, but the value $x$ saturates when the amount of activating gold is $10^{-3}$ to $3 \times 10^{-3}$ g per g of zinc sulfide. As the amount of activating gold increases beyond this range, the value $x$ decreases gradually. A similar tendency is observed in the relation between the amount of activating gold and the brightness.

The ZnS : Au : Al phosphor to be used for the white-emitting phosphor of this invention emits a yellowish green-to-yellow light and has a sufficiently high luminance, and in this phosphor, the amount incorporated of activating gold is within a range of from $5 \times 10^{-4}$ to $10^{-2}$ g per g of zinc sulfide. Especially, a ZnS : Au : Al phosphor containing activating gold in an amount of $1.5 \times 10^{-3}$ g per g of zinc sulfide has most preferred properties in respect to the emission color and luminance and accordingly, a good white-emitting phosphor can be obtained. ZnS : Au : Al phosphors in which the amount of activating gold is smaller than $5 \times 10^{-4}$ g or larger than $10^{-2}$ g per g of zinc sulfide cannot be used because the emission color is green and the brightness is low.

Figure 2:
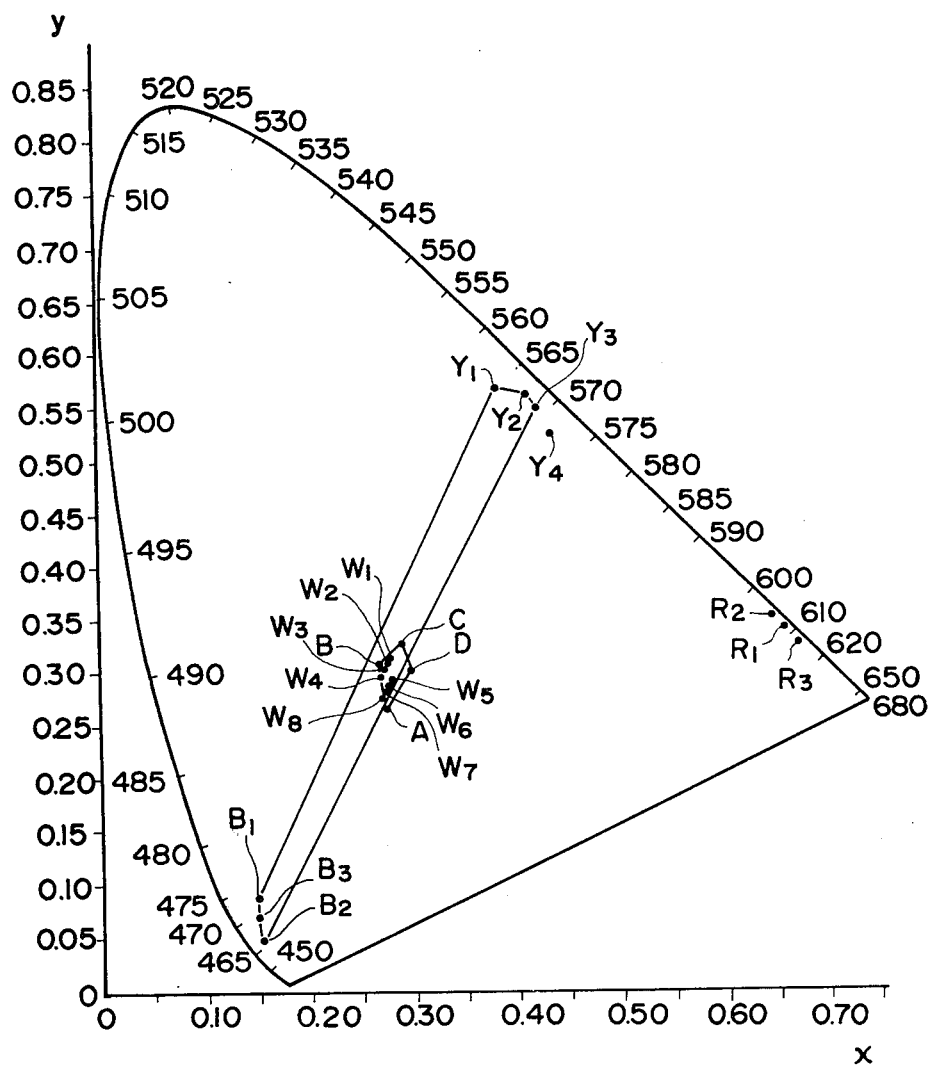
FIG. 2 illustrates the JEDEC standard, the color points of the yellow-emitting and blue-emitting components of the white-emitting phosphor of this invention, the color point of the red-emitting phosphor of the white-emitting phosphor of this invention, and the color point of the white-emitting phosphor of this invention according to the CIE colorimetric system.

In FIG. 2, the point $Y_1(x = 0.380, y = 0.565)$, the point $Y_2(x = 0.415, y = 0.560)$ and the point $Y_3(x = 0.420, y = 0.550)$ denote the color points of ZnS : Au : Al phosphor containing activating gold in amounts of $5 \times 10^{-4}$ g, $10^{-2}$ g and $1.5 \times 10^{-3}$ g per g of zinc sulfide, respectively. From FIG. 2, it will readily be understood that the color points of ZnS : Au : Al phosphor containing activating gold in an amount of $5 \times 10^{-4}$ g to $10^{-2}$ g per g of zinc sulfide are located substantially on the curve formed by the points $Y_1$, $Y_2$ and $Y_3$.

The amount of aluminum for activation is half the amount of activating gold. More specifically, the amount of activating aluminum is within a range of $2.5 \times 10^{-4}$ g to $5 \times 10^{-3}$ g per g of zinc sulfide.

A blue-emitting ZnS : Ag phosphor is used as the blue component of the white-emitting phosphor of this invention. The ZnS : Ag phosphor obtained by adding a suitable amount of a silver compound such as silver nitrate ($AgNo_3$) to raw powder of zinc sulfide and firing the mixture at 900° to 1000°C. in a reducing atmosphere for 1 to 5 hours and this phosphor has a cubic crystal structure. The emission color of this phosphor varies depending on the amount of activating silver. In general, as the amount of activating silver increases, the emission color shifts to a shorter wavelength region. In view of the emission color and brightness, in the ZnS : Ag phosphor to be used for the white-emitting phosphor of this invention, the amount of activating silver is adjusted within a range of $10^{-5}$ g to $10^{-3}$ g per g of zinc sulfide. An especially good white-emitting phosphor is obtained when a ZnS : Ag phosphor containing activating silver in an amount of $10^{-4}$ g per g of zinc sulfide is employed. In FIG. 2, the point $B_1(x = 0.142, y = 0.085)$, the point $B_2$ ($x = 0.148, y = 0.050$) and the point $B_3$ ($x = 0.145, y = 0.070$) denote the color points of ZnS : Ag phosphor containing activating silver in amounts of $10^{-5}$ g, $10^{-3}$ g and $10^{-4}$ g per g of zinc sulfide, respectively. From FIG. 2, it will readily be understood that the color points of ZnS : Ag phosphor containing activating silver in an amount of $10^{-5}$ g to $10^{-3}$ g per g of zinc sulfide are located substantially on the curve formed by connecting the points $B_1$, $B_2$ and $B_3$.

In the white-emitting phosphor of this invention, the mixing weight ratio of the ZnS : Ag phosphor to the ZnS : Au : Al phosphor is within a range of 0.70 to 1.30, preferably 0.80 to 1.10, especially preferably 0.90 to 1.00.

The white-emitting phosphor free of cadmium, which is obtained by mixing the ZnS : Au : Al and ZnS : Ag in the above mixing ratio, has a color point included in the JEDEC standard or in the white color region near the said standard. Further, it has sufficiently high brightness. Accordingly, it can be used effectively as a phosphor for black and white television.

Another embodiment of the white-emitting phosphor of this invention will now be described.

The cadmium-free white-emitting phosphor of this invention, which is composed, as illustrated above, of a yellowish green-to-yellow emitting ZnS : Au : Al phosphor and a blue-emitting ZnS : Ag phosphor has a color point included in the JEDEC standard surrounded by chromatocity points A ($x = 0.273, y = 0.282$), B ($x = 0.267, y = 0.303$), C ($x = 0.286, y = 0.326$) and D ($x = 0.290, y = 0.303$) as shown in FIG. 2 or in the white color region near the said standard, and it has a sufficiently high brightness. However, it cannot be said that the white color-reproducing region of the above phosphor be complete, but it slightly deviates toward the short wavelength side (i.e., the green side). This is apparent from the fact that in FIG. 2 the JEDEC standard is not completely included between the line $Y_1$–$B_1$ and the line $Y_3$–$B_2$. The cause resides in the ZnS : Au : Al phosphor as the yellow-emitting component. More specifically, though it is possible to obtain a ZnS : Au : Al phosphor having the emission color considerably deviated to the long wavelength side by controlling the amount of activating gold, as compared with the conventional yellow components such as (Zn, Cd)S: Ag and (Zn, Cd)S : Cu : Al, its emission color is still on the short wavelength side, namely the green side. Of course, prolongation of the wavelength of the emission color of the ZnS : Au : Al phosphor can readily be accomplished by substituting a part of zinc sulfide as the host material by cadmium sulfide. However, such a phosphor is not preferred because cadmium is incorporated into the phosphor.

In accordance with a preferred embodiment of this invention, a small amount of a red-emitting phosphor is incorporated into the above ZnS : Au : Al phosphor to shift the emission color of the yellow component to a longer wavelength side, whereby the white color-reproducing region is further completed in the resulting white-emitting phosphor.

There is employed at least one member of europium-activated yttrium oxysulfide ($Y_2O_2S$ : Eu), europium-activated yttrium oxide ($Y_2O_3$ : Eu) and europium-activated yttrium vanadate ($YVO_4$: Eu) phosphors. En each of the foregoing europium-activated phosphors, the amount of activating europium is within a range of $1.0 \times 10^{-2}$ g to $1.5 \times 10^{-1}$ g per g of the host material, namely $Y_2O_2S$, $Y_2O_3$ or $YVO_4$. Especially when the amount of activating europium is $5 \times 10^{-2}$ g to $6 \times 10^{-2}$ g in the case of $Y_2O_2S$ : Eu and $Y_2O_3$ : Eu or $7 \times 10^{-2}$ g to $8 \times 10^{-2}$ g in the case of the $YVO_4$: Eu, an optimum luminescent efficiency can be obtained and hence, better results are obtained when such red-emitting phosphor are used.

In FIG. 2, the point $R_1(x = 0.652, y = 0.346)$, the point $R_2(x = 0.642, y = 0.352)$ and the point $R_3(x = 0.668, y = 0.328)$ denote the color points of $Y_2O_2S$ : Eu, $Y_2O_3$ : Eu and $YVO_4$ : Eu activated with the above-mentioned optimum amount of europium, respectively. The mixing weight ratio of at least one red-emitting phosphor of the $Y_2O_2S$ : Eu, $Y_2O_3$ : Eu and $YVO_4$ : Eu to the ZnS : Au : Al is not greater than 3/7. In other words, the amount of the red-emitting phosphor is not greater than 30% by weight based on the mixture of the ZnS : Au : Al and red-emitting phosphor. If this mixing weight ratio is greater than the above upper limit, the emission color of the mixture, namely the yellow component, shifts excessively to the long wavelength side (i.e., the red side), and further, since the brightness of the red-emitting phosphor is lower than that of the ZnS : Au : Al, the brightness of the resulting yellow component is drastically lowered and such yellow component cannot be used as the component constituting the white-emitting phosphor of this invention. Good results are obtained when the mixing weight ratio of the red-emitting phosphor to the ZnS : Au : Al is of 3/17 to ⅓ (15 to 25% by weight based on the whole yellow component), especially about ¼ (20% by weight).

The white-emitting phosphor according to the above preferred embodiment of this invention is obtained by adding a ZnS : Ag as the blue component to a yellow component obtained by mixing a yellowish green-to-yellow emitting ZnS : Au : Al and at least one red-emitting phosphor of $Y_2O_2S$ : Eu, $Y_2O_3$ : Eu and $YVO_4$ : Eu in the above-mentioned mixing ratio. The mixing weight ratio of the yellow component and the blue component is the same as described above with respect to the white-emitting phosphor including only the ZnS : Au : Al and the ZnS : Ag. More specifically, the mixing weight ratio of the ZnS : Ag as the blue-component to the yellow component composed of the ZnS : Au : Al and the red-emitting phosphor is within a range of 0.70 to 1.30, preferably 0.80 to 1.10. Especially good results are obtained when the above mixing weight ratio is within a range of 0.90 to 1.00.

The white-emitting phosphor obtained in the above-mentioned manner by adding at least one red component of $Y_2O_2S$ : Eu, $Y_2O_3$ : Eu and $YVO_4$ : Eu to a yellowish green-to-yellow emitting ZnS : Au : Al and a blue emitting ZnS : Ag is characteristic over the white-emitting phosphor obtained by mixing a yellowish green-to-yellow emitting ZnS : Au : Al component and a blue emitting ZnS : Ag component alone in the point that the white color-reproducing region shifts to a longer wavelength side as a whole and it is further completed.

Further, incorporation of at least one red-emitting component of $Y_2O_2S$ : Eu, $Y_2O_3$ : Eu and $YVO_4$ : Eu into ZnS : Au : Al and ZnS : Ag phosphors solves the problem of the yellow center on screening of black and white tubes. The fundamental cause of the yellow center is that a picture tube has a curved surface. When the white emitting phosphor is screened on a picture tube, because of this curvature the thickness of the phosphor layer is larger in the central portion than in the peripheral portion. The body color of the (Zn, Cd)S : Ag phosphor as the yellow component is light yellow, and this body color absorbs the blue emission of the ZnS : Ag phosphor as the blue component. Since this absorption is more conspicuous in the central portion of the picture tube.

Each of $Y_2O_2S$ : Eu, $Y_2O_3$ : Eu and $YVO_4$ : Eu phosphors has a white body color, and therefore, the body color of the ZnS : Au : Al phosphor can be whitened by incorporation of such red-emitting phosphor and occurrence of the yellow center can be effectively prevented.

Incidentally, a cadmium-free white-emitting phosphor can be prepared by mixing a copper- and aluminum-activated zinc sulfide (ZnS : Cu : Al) as the green component, a ZnS : Ag phosphor as the blue component and at least one red component of $Y_2O_2S$ : Eu, $Y_2O_3$ : Eu and $YVO_4$ : Eu in a mixing ratio of about 3 : 3 : 4. This combination is now used as phosphor for color television, but this phosphor cannot be used as a phosphor for black and white television. The reason is that since the emission color of the ZnS : Cu : Al phosphor is more on the short wavelength side than the ZnS : Au : Al phosphor, in order to obtain a white emission the red-emitting phosphor having a low brightness should be used in a large quantity and hence, the brightness of the resulting composite phosphor is drastically lowered. Further, the red-emitting phosphor contains a large amount of a rare earth element which is expensive, and use of a phosphor containing such expensive red-emitting phosphor is not preferred from the economical viewpoint.

Unlike the conventional phosphors for black and white television, the white-emitting phosphor of this invention does not at all contain cadmium. Special cares such as taken in the conventional cadmium-containing phosphors need not be taken in the step of preparing or screening them on picture tubes, and provision of a large-scale equipment for the treatment of wastes for prevention cadmium contamination is quite unnecessary. Furthermore, on the side of users of television sets, there is no risk of damage by cadmium at unexpected breakage of television sets or at disposal of discarded television sets. Thus, this invention makes great industrial contributions to the art.

This invention will now be illustrated in more detail by reference to the following examples.

EXAMPLE 1

A composite phosphor obtained by mixing a ZnS : Ag (Ag/ZnS = $10^{-4}$ g/g) and a ZnS :,Au : Al (Au/ZnS = $1.5 \times 10^{-3}$ g/g, Al/ZnS = $7.5 \times 10^{-4}$ g/g) in a mixing weight ratio (ZnS : Ag/ZnS : Au : Al) of 0.8, 0.9, 1.0 or 1.1 has color point $W_1$, $W_2$, $W_3$, or $W_4$ shown in FIG. 2.

ZnS : Ag/ZnS : Au : Al = 0.8, $W_1(x=0.273, y=0.305)$
ZnS : Ag/ZnS : Au : Al = 0.9, $W_2(x=0.270, y=0.300)$
ZnS : Ag/ZnS : Au : Al = 1.0, $W_3(x=0.267, y=0.295)$
ZnS : Ag/ZnS : Au : Al = 1.1, $W_4(x=0.264, y=0.290)$

The brightness of each of the foregoing composite phosphors is substantially comparable to that of a cadmium-containing white-emitting phosphor now actually used for black and white television.

EXAMPLE 2

A ZnS : Au : Al phosphor (Au/ZnS = $1.5 \times 10^{-3}$ g/g, Al/ZnS = $7.5 \times 10^{-4}$ g/g) and a $Y_2O_2S$ : Eu phosphor (Eu/$Y_2O_2S$ = $5 \times 10^{-2}$ g/g) are mixed in a weight ratio ($Y_2O_2S$ : Eu/ZnS : Au : Al) of ¼. The emission color of the resulting composite phosphor is denoted by the color point $Y_4(x = 0.430, y = 0.530)$ in FIG. 2. A composite phosphor obtained by mixing the above mixture and a ZnS : Ag phosphor (Ag/Zns = $10^{-4}$ g/g) in a mixing weight ratio [ZnS : Ag/(ZnS : Au : Al + $Y_2O_2S$ : Eu)] of 0.8, 0.9, 1.0 or 1.1 has an color point $W_5$, $W_6$, $W_7$ or $W_8$ shown in FIG. 2.

ZnS :Ag/(ZnS:Au:Al+$Y_2O_2S$:Eu)=0.8, $W_5(x=0.278, y=0.295)$
ZnS:Ag/(ZnS:Au:Al+$Y_2O_2S$:Eu)=0.9, $W_6(x=0.275, y=0.290)$
ZnS:Ag/(ZnS:Au:Al+$Y_2O_2S$:Eu)=1.0, $W_7(x=0.272, y=0.285)$
ZnS:Ag/(ZnS:Au:Al+$Y_2O_2S$:Eu)=1.1, $W_8(x=0.269, y=0.280)$

The brightness of each of the foregoing composite phosphors is substantially comparable to that of a cadmium-containing white-emitting phosphor now actually used for black and white television.

When a $Y_2O_3$ : Eu or $YVO_4$ : Eu phosphor is used instead of the $Y_2O_2S$ : Eu phosphor in the same mixing ratio as in the above, similar results are obtained with respect to the emission color and brightness.

What we claim is:

1. A white-emitting phosphor for black and white television which consists essentially of a mixture of a yellowish green-to-yellow emitting, gold- and aluminum-activated zinc sulfide phosphor in which the amount of activating gold is within a range of $5 \times 10^{-4}$ g to $10^{-2}$ g per g of zinc sulfide and the amount of activating aluminum is within a range of $2.5 \times 10^{-4}$ g to $5 \times 10^{-3}$ g per g of zinc sulfide and a blue-emitting silver-activated zinc sulfide phosphor in which the amount of activating silver is within a range of $10^{-5}$ g to $10^{-3}$ g per g of zinc sulfide, wherein the weight ratio of the silver-activated zinc sulfide to the gold- and aluminum- activated zinc sulfide is within a range of 0.70 to 1.30.

2. A white emitting phosphor of claim 1 wherein the weight ratio of the silver-activated zinc sulfide to the gold- and aluminum-activated zinc sulfide is within a range of 0.80 to 1.10.

3. A white-emitting phosphor of claim 1 wherein the weight ratio of the silver-activated zinc sulfide to the gold- and aluminum-activated zinc sulfide is within a range of from 0.90 to 1.00.

4. A white-emitting phosphor for black and white television which consists essentially of a mixture of a yellowish green-to-yellow emitting, gold- and aluminum-activated zinc sulfide phosphor in which the amount of activating gold is within a range of $5 \times 10^{-4}$ g to $10^{-2}$ g per g of zinc sulfide and the amount of activating aluminum is within a range of $2.5 \times 10^{-4}$ to $5 \times 10^{-3}$ g per g of zinc sulfide, a blue-emitting silver-activated zinc sulfide phosphor in which the amount of activating silver is within a range of $10^{-5}$ g to $10^{-3}$ g per g of zinc sulfide, and at least one red-emitting phosphor selected from europium-activated yttrium oxysulfide, europium-activated yttrium oxide and europium-activated yttrium vanadate, in each of which the amount of activating europium is within a range of $1.0 \times 10^{-2}$ g to $1.5 \times 10^{-1}$ g per g of yttrium oxysulfide, yttrium oxide or yttrium vanadate, wherein the weight ratio of said red-emitting phosphor to said gold- and aluminum-activated zinc sulfide phosphor is not greater than 3/7 and the weight ratio of the silver-activated zinc sulfide phosphor to the sum of the gold- and aluminum-activated zinc sulfide phosphor and the red-emitting phosphor is within a range of 0.70 to 1.30.

5. A white-emitting phosphor of claim 4 wherein the weight ratio of said red-emitting phosphor to the gold- and aluminum-activated zinc sulfide phosphor is within a range of 3/17 to ⅓.

6. A white-emitting phosphor of claim 4 wherein the weight ratio of the red-emitting phosphor to the gold- and aluminum-activated zinc sulfide phosphor is ¼.

7. A white-emitting phosphor of claim 4 wherein the weight ratio of the silver-activated zinc sulfide phosphor to the sum of said gold- and aluminum-activated zinc sulfide phosphor and said red-emitting phosphor is within a range of from 0.80 to 1.10.

8. A white-emitting phosphor of claim 4 wherein the weight ratio of the silver-activated zinc sulfide phosphor to the mixed phosphor of the gold- and aluminum-activated zinc sulfide phosphor and the red-emitting phosphor is within a range of 0.90 – 1.00.

* * * * *